United States Patent [19]

Yoshii

[11] Patent Number: 4,553,624
[45] Date of Patent: Nov. 19, 1985

[54] FRONT-WHEEL DRIVING APPARATUS
[75] Inventor: Takashi Yoshii, Sakai, Japan
[73] Assignee: Kubota, Ltd., Osaka, Japan
[21] Appl. No.: 501,235
[22] Filed: Jun. 6, 1983
[51] Int. Cl.[4] ............................................ B60K 17/30
[52] U.S. Cl. ..................................... 180/255; 74/417;
180/261; 180/262; 280/96.1
[58] Field of Search ............... 180/252, 255, 256, 260,
180/261, 262, 263, 264, 265, 266, 267, 906;
280/771, 96.1; 74/386, 417, 424

[56] References Cited
U.S. PATENT DOCUMENTS

| 2,306,958 | 12/1942 | Kurti | 74/386 |
| 3,980,151 | 9/1976 | Murayama et al. | 180/261 |
| 4,301,886 | 11/1981 | Kinoshita et al. | 180/261 |

FOREIGN PATENT DOCUMENTS

| 65930 | 5/1979 | Japan | 180/261 |
| 1272 | 1/1980 | Japan | 180/252 |

Primary Examiner—Joseph F. Peters, Jr.
Assistant Examiner—Mitchell J. Hill
Attorney, Agent, or Firm—Jordan and Hamburg

[57] ABSTRACT

A front-wheel driving apparatus for use in tractors and the like has bevel-gear cases one each of which a front-wheel case is fitted for free rotation about a kingpin axis, the front-wheel case being adapted to support a front wheel and accommodate therein a bevel-gear train which is for incorporating the kingpin and the front wheel. Both upper and lower end portions of the kingpin are supported on the bevel-gear case via the respective bearings, and are provided with the respective bevel pinions as mounted thereon so as to exert axial thrusts on the kingpin in directions opposite to each other, and further with the respective thrust retainers as secured thereon for taking up any possible overall balance thrust. A hub base is consolidatedly incorporated in the front-wheel case, and on the hub base there is fitted, for free rotation, through a bevel gear fixture base a bevel gear which meshes with the lower bevel pinion on the kingpin. The front wheel is mounted on an outer end portion of the bevel gear fixture base.

8 Claims, 5 Drawing Figures

FRONT-WHEEL DRIVING APPARATUS

BACKGROUND OF THE INVENTION (1) Field of the Invention

This invention relates to a front-wheel driving apparatus in which a bevel-gear case is fixed to each end of a front-wheel axle case, a kingpin is fitted in the bevel-gear case, and a front-wheel case is mounted for free rotation about the kingpin axis.

(2) Description of the Prior Art

Front-wheel driving apparatuses for tractors, of the structure as mentioned just above, are well known for instance as disclosed in JP-U SHO. No. 56-139223 and U.S. Pat. No. 2306958.

In such known apparatuses, the mode of supporting the kingpin is in such manner that both upper and lower ends of the kingpin are supported on both the bevel-gear case and the front-wheel case. On account thereof, particularly of thusly required lower bearing, the bevel gear for speed reduction can not be made large enough and therefore the reduction ratio can not be large as desired.

Further, so to a hub base, it is supported on a pair of inner and outer bearings, while the bevel gear is fixedly secured on this hub base, in view that the hub base is free to rotate relative to the front-wheel case. On account thereof, this hub base must inevitably be of considerable length, and therefore the front wheel can not be disposed close enough, as desired, to the kingpin, thus to result in supporting the front wheels rather unstably and also in making the tread of the front wheels considerably long.

SUMMARY OF THE INVENTION

This invention has as its object to overcome the shortcomings of the conventionl front-wheel driving apparatuses as mentioned above. In order to attain the object, the front-wheel driving apparatus according to this invention of the type such that on both ends of a front-axle case there respectively are mounted bevel-gear cases each accommodating therein a bevel-gear train for interlocking a differential output shaft and a kingpin; that at each of the bevel-gear cases there is provided a front-wheel case, for free rotation about the kingpin axis, for supporting a front wheel; and that within the front-wheel case there is accommodated a bevel-gear train for interlocking the kingpin and the front wheel: is characterized in that both upper and lower end portions of the kingpin are supported on the part of the bevel-gear case side respectively via bearings; that on both side upper and lower end portions of the kingpin there respectively are mounted bevel pinions which are constituent parts of the respective bevel-gear trains, as disposed so as to respectively exert axial thrusts on the kingpin in directions opposite to each other; that on the upper and lower tip end portions of the kingpin there further are secured, respectively, thrust retainers for taking up any possible overall balance thrust; that a hub base is consolidatedly incorporated in the front-wheel case; that on the hub base there is fitted, for free rotation, through a bevel gear fixture base a bevel gear which meshes with the lower bevel pinion on the kingpin; and that the front-wheel is mounted on an outer end portion of the bevel gear fixture base.

In the front-wheel driving apparatus according to this invention as above, since the kingpin is supported, by means of the pair of upper and lower bearings, on the bevel-gear case fixed to each end of the front-wheel axle case, in the said manner namely such that the axial thrusts, exerted on the kingpin respectively by the upper and lower bevel pinions, are in directions opposite to each other for thus effectively canceling each other, it is hereby possible to minimize the kingpin bearing and also to enlarge the speed reduction ratio. Thus, any possible overall balance thrust acting axially on the kingpin can now securely and simply taken up by the thrust retainers mounted on tip end portions of the kingpin, leading therefore to simplification of the structure. As is especially advantageous, it is possible to make the lower kingpin bearing without any duty of taking up the axial thrust, thus to construct same as a simple plane bearing, to therefore result in the kingpin substantially of single-end support type.

Furthermore, since the hub base is consolidatedly incorporated in the front-wheel case and on the hub base there is fitted for free rotation the bevel gear; the hub-base supporting structure is simpler and stabler in comparison with the structure in the case of rotating hub base, and it is hereby possible to make the hub base as supported in cantilever manner and short in size, which is advantageous also in view of structural strength and allows to dispose the front wheel, which is mounted on the outer end portion of the bevel gear fixture base, close enough to the kingpin as desired, and to therefore make the tread of the front wheels short enough. Still further advantages of this invention will become clear from the detailed description given hereunder with reference to the accompanying drawings.

DESCRIPTION OF THE PREFERRED EMBODIMENTS

Figure 1:
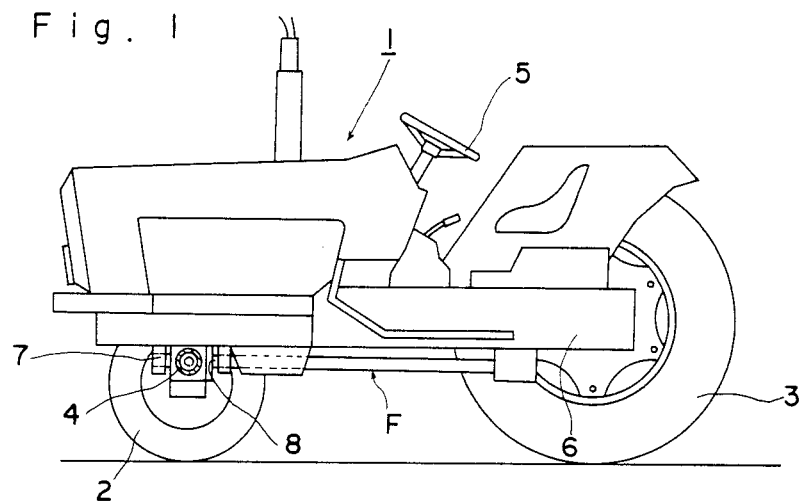
FIG. 1 is an overall side elevation of a tractor as a specific example of the vehicle in which the appratus of this invention is incorporated.

Referring to the drawings, the illustrated embodiments of this invention are described in detail hereunder:

Shown in FIG. 1 is a tractor 1 of two-axle four-wheel type, thus with a pair of left and right front wheels 2 and a pair of left and right rear wheels 3, the front wheels 2 being mounted on both ends of a front-axle case 4 so as to be steerable by means of a steering apparatus 5.

The rear wheels 3 are driven via a transmission apparatus designed for suitable speed changing of the engine power output, the transmission apparatus being accommodated within a transmission case 6 which dually serves also for constituting a chassis.

The front-wheel case 4 is suspended, at its axial central portion, from a front-axle support 7 via a so-called center-pin apparatus 8, for free rocking about an axis extending in the fore-and-aft direction.

Within the front-axle case 4 there is accommodated a differential apparatus which is operatively driven by the transmission apparatus within the transmission case 6, via a propeller apparatus F, so that the front wheels and the rear wheels are synchronously or tunedly drivable.

Figure 2:
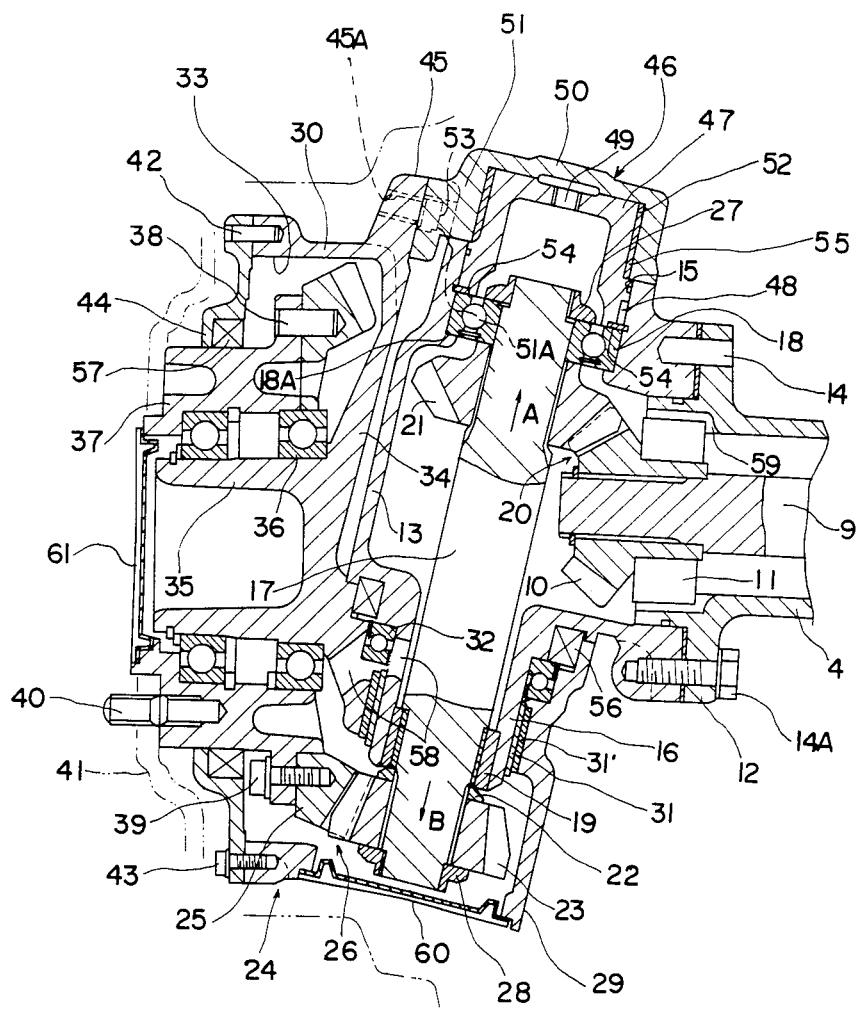
FIG. 2 is a sectional side elevation of the apparatus according to this invention.

Further details of the front-wheel driving apparatus are seen in FIG. 2 and also the views subsequent thereto.

By the way, both ends of the front-axle case 4 are each provided with the respective units of the front-wheel driving apparatus, but in view that the left and right units in such pair are identical in their structure, description in detail is given hereunder only with respect to one unit of the pair.

Referring to FIG. 2, a differential output shaft 9 is insertedly supported within the front-axle case, more specifically is provided at its tip end with a bevel pinion 10 mounted there by means of splining or the like, and is supported on the front-axle case tip end via a bearing 11.

Figure 3:
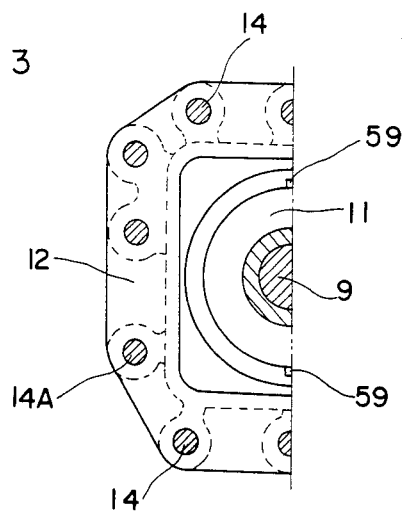
FIG. 3 is an end view of a bevel-gear case fixture portion, cut in half.

Around the front-axle case tip end there is formed a fixture flange 12, and a bevel-gear case 13 is detachably fixed on to the fixture flange 12 by means of knock pins 14 and bolts 14A, as shown also in FIG. 3.

The bevel-gear case 13 has an opening 15 at its upper portion, while at its lower portion there is formed a tubular portion 16 of a contracted diameter; the opening 15 and the tubular portion 16 being coaxially aligned, thus having one and the same, common axis.

Within the bevel-gear case 13 there is fitted a kingpin 17 as slanted in a set kingpin angle. In the illustrated embodiment, the kingpin 17 has its upper end supported via a radial bearing 18 and has its lower end fitted in the tubular portion 16 and supported via a needle bearing 19.

The kingpin 17 and the differential output shaft 9 are operatively interconnected via a bevel-gear train 20 accommodated within the bevel-gear case 13. The bevel-gear train 20 is constructed by securely fitting an upper bevel pinion 21 on an upper end portion of the kingpin 17 by means of splining, keying or the like, and having the upper bevel pinion 21 mesh, from above, with a mating bevel pinion 10 fitted on the differential output shaft 9.

On a lower end portion of the kingpin 17 there is securely fitted a lower bevel pinion 23 via a collar 22 by means of splining, keying or the like, and the lower bevel pinion 23 meshes, from below, with a mating bevel gear 25 accommodated within a front-wheel case 24, to thus construct a bevel-gear train 26 for operatively interconnecting the kingpin 17 and an associated front wheel.

In this way, the kingpin 17 is borne and held in place, at both its upper end lower end portions, only by the bevel-gear case 13 via the bearings 18, 19, and in order to bear the thrusts caused by the bevel pinions 21, 23 disposed as mentioned above to result in the thrusts acting on the kingpin 17 as tensile stresses as shown by arrows A and B, there are screwedly fixed, on threaded portions of the kingpin at both its outer end portions beyond the respective bearings 18 and 19, thrust retainers 27 and 28 illustrated as the respective nuts.

The front-wheel case 24 consists integrally of a lower case 29 and a lateral case 30, is thus generally of L-shape as viewd from the rear, and accommodates therein the bevel-gear train 26 consisting of the lower bevel pinion 23 and the bevel gear 25.

The lower case 29 is attached to the tubular portion 16 of the bevel-gear case 13 in a manner of being fitted thereon for free rotation via an inner ring 31 and a bush 31', and is further supported via a thrust bearing 32.

The lateral case 30 opens laterally outwardly and has ample open portion 33 sufficient for freely fitting in and out therethrough the bevel gear 25, and on its inner lateral wall 34 there is formed a hub base 35 of hollow structure as is integrally formed to outwardly protrude therefrom, and on this hub base 35 there is fitted a bevel-gear fixture base 37, for free rotation, in the illustrated embodiment via two juxtaposed ball bearings 36.

The bevel-gear fixture base 37 is generally of ring shape, and on to its inner end face the bevel gear 25 is properly secured by means of knock pins 38 and bolts 39, while on to its outer end face there is detachably mounted a wheel disc 41, of the associated front wheel, by means of a plurality of bolts 40.

Furthermore, the open portion 33 of the case 30 is covered up with a lid 44, by means of knock pins 42 and bolts 43, and on an upper edge portion of the inner lateral wall 34 of the lateral case 30 there is formed an upright fixture flange 45 in integral protrusion therefrom, extending in the illustrated embodiment in parallel to the axis of the kingpin, and to this fixture flange 45 there is mounted a knuckle arm 46 in a manner as now described hereunder:

In the opening 15 of the bevel-gear case 13 there is fitted a knuckle pin 47 coaxially with the kingpin 17. In the illustrated embodiment, the fitting is in a manner of clamping insertion, blocking the relative rotation by constructing the fitting portion of the knuckle pin as is provided with transverse depressions and by forcibly fitting two pins or flat plates 48 into such depressions. It is well possible, by providing the structure for realizing sufficiently strong clamping insertion, to omit such pins or plates 48.

Though the knuckle pin 47 in this specific embodiment is of top-closed hollow cylindrical shape, it is as well possible to construct same in hollow cylindrical shape open in both upper and lower ends or as a solid cylinder or column. In the case of a top-closed hollow cylinder as in the illustrated instance, it is possible to inject lubicant such as grease or the like, via an oiling-plug fixture hole 49 formed in its top, into its interior space thereunder and confine it there, thus for lubricating the bearing 18. Accordingly, the bearing 18 is in such case provided with a seal 18A.

Figure 4:
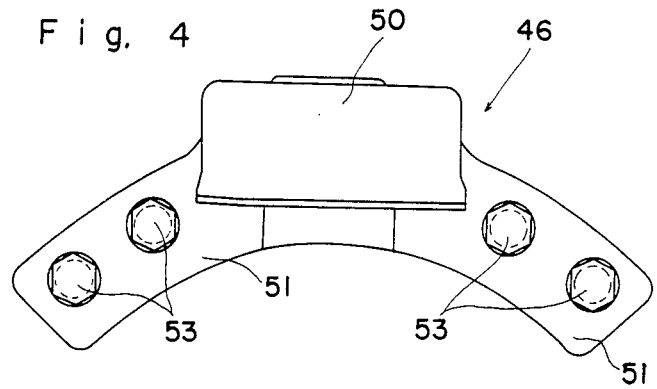
FIG. 4 is a side view of a knuckle arm.

The knuckle arm 46 has, as integral components, a bottom-closed fitting portion 50 and fixture flanges 51. The fitting portion 50 is of hollow cylindrical shape and is fitted on the knuckle pin 47 via a bush 52, for free rotation. As shown in FIG. 4, the fixture brackets 51 extend from the fitting portion 50 in fore-and-aft direction, and are abuttedly opposed on to the upright fixture flange 45 on the part of the front-wheel case side and mounted thereto in the illustrated instance by means of two bolts 53 each on either of fore and aft sides, fitted transversely from the inner side.

For the purpose, the fixture flange 45 is provided with tapped bores 45A and the fixture brackets 51 are provided with so-called dummy holes 51A, namely through bores amply and freely to pass the bolts, in aligned registration with the respective mating tapped bores 45A.

By the way, the knuckle arm 46 is provided with a steering arm, though not illustrated, in protrusion either forwardly or rearwardly or else laterally inwardly therefrom, as is integral therewith or is attached thereto via bolts or the like. It is of course so adapted that the steering force driving from the steering apparatus 5 is transmitted to the steering arm, and that the pair of left and right steering arms are interlocked via a tie rod or the like.

Further designated in FIG. 2 are: at 54 a stopper annulus for the bearing 18, at 55 a seal ring interposed in between the fitting portion 50 and the knuckle pin 47, at 56 a dust seal interposed to be confined in an annular space as is defined in between the bevel-gear case 13 and the lower case 29 of the front-wheel case 24, at 57 a dust seal interposed to fill an annular adjourning portion in between the lid 44 and the bevel-gear fixture base 37, at 58 a lubricant oil passage providing communication in between the tubular portion 16 and the lower case 29, and at 59 a lubricant oil passage or passages formed at the portion supporting the bearing 11 outer periphery. It is thus possible to apply the lubricant oil into the lower case 29 at the level near the bearing as well as into the bevel-gear case 13, while purging out previously prevailing air, by injecting the lubricant oil via a non-illustrated oiling plug as is provided on the front-axle case 4 to thus pass through the passages 58 and 59. Shown still further to 60 is a lower-case-bottom covering lid and at 61 a hub lid, they both being free to attach and to detach.

Yet further, the inner lateral wall 34 of the frontwheel case 24 is provided, though not illustrated, with steering-angle-restraining stoppers formed thereon as disposed respectively forwardly and rearwardly of the kingpin, substantially symmetrically with respect thereto, and for the purpose the bevel-gear case is accordingly provided with the respective mating stoppers.

Figure 5:
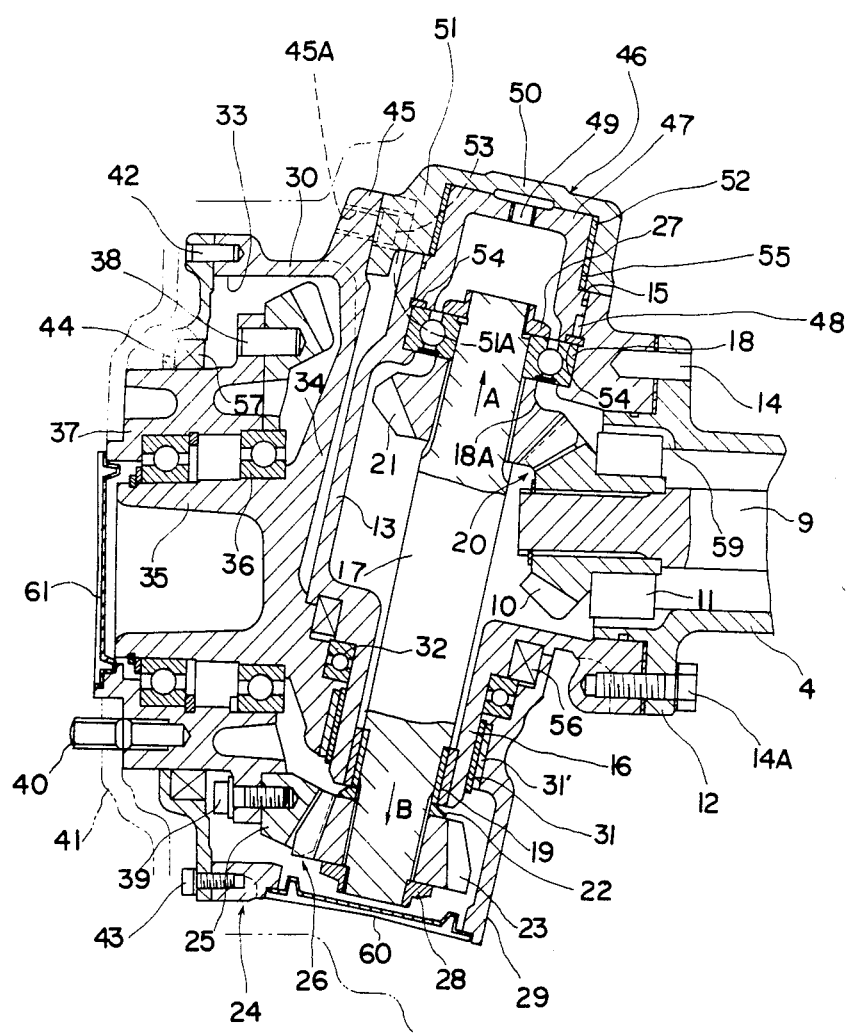
FIG. 5 is a view similar to FIG. 2 but showing a modified embodiment of this invention.

FIG. 5 is similar to FIG. 2, but shows a second embodiment which differs from the previous, namely a first, embodiment per said FIG. 2 only in that the previously provided lubricant oil passage 58 is now omitted. Otherwise, the construction is identical with each other, and so like parts are all designated by like reference symbols.

Function of such structure is now described hereunder:

As the differential output shaft 9 is driven, then the kingpin 17 is driven as interlocked via the bevel-gear train 20. Here in these instances, the power is further transmitted such that the bevel-gear fixture base 37 is driven, via the bevel-gear train 26, to rotate about the hub base 35, and thus the front wheels 2 are driven under the predetermined speed reduction (might as well be speed augmentation if so desired) synchronously or tunedly with respect to the rear wheels 3.

When the steering apparatus 5 is maneuvered for left or right steering, then each of the front wheels 2 is accordingly rotated, together with the associated front-wheel case 24, about the axis of the kingpin 17 to thus realize the intended steering, on account that the knuckle arm 46 is fitted, for free rotation and coaxially with the axis of the kingpin 17, on the knuckle pin 47 which is in turn fitted, without possibility of relative rotation, into the top opening 15 of the bevel-gear case 13, and that the fixture bracket 15 of the knuckle arm 46 is securely fixed, by means of the bolts 53, to the upright fixture flange 45 on the part of the front-wheel case 24 side.

Slant load of the front-wheel case 24 is substantially borne by the knuckle pin 47 without subjecting the bolts 53 to any substantial loading, on account that the one hand the fitting portion 50 of the knuckle arm 46 is made as bottom-closed and is fitted on the knuckle pin 47 and that on the other hand the knuckle arm 46 is fixed on to the part of the front-wheel case 24 side by means of the bolts 53. Therefore, the bolts 53 may be screwed in, from the laterally inner side, and easily tightened up without any serious hindrance thereagainst with the front wheel 2, and if any front wheel 2 may come to float, then the bolts 53 can serve for securely supporting same.

In thus transmitting the torque from the differential output shaft 9 via the bevel-gear grain 20 to the kingpin 17 and further the torque from the kingpin 17 via the bevel-gear train 26 to the front wheel 2, axial thrusts acting on the kingpin 17 result in tensile stresses as shown by arrows A and B, this meaning that the bearings 18 and 19 for supporting the kingpin 17 may both safely be made compact, the overall or ultimate balance axial thrust being sufficiently coped with by means only of the thrust retainers 27 and 28.

Logically, this further means that it is not required to have the bottom end of the kingpin 17 supported on the front-wheel case 24, and such omission of supporting connection at the bottom results in allowing to accordingly enlarge the diameter of the bevel gear 25, to thus obtain a larger ratio of the speed reduction.

Furthermore, since the hub base 35 is made integral with the front-wheel case 24, as the base on which the bevel gear 25 unit is fitted for free rotation, the wheel-supporting structure is far simpler and stabler than in the case of the structure with rotating hub bases. In consequence hereof, it is now possible to provide substantially short hub base 35 in so supporting same in such cantilever manner, and since the axial length of the hub base 35 is thusly short, it in turn is possible to dispose the front-wheel close enough to the bevel-gear case 13, to thus shorten the steering arm length and therefore to realize agile steering operation.

I claim:

1. A front wheel driving apparatus comprising:
  a front axle case (4) housing a differential output shaft (9) with an output bevel gear (10) at the end portion thereof;
  a bevel gear case (13) removably attached to the outer end of said front axle case (4) and having upper and lower tubular portions aligned coaxially; and
  a kingpin (17) journalled at the upper portion thereof to said upper tubular portion by a radial bearing (18) and at the lower portion thereof to said lower tubular portion (16) by a needle bearing (19) and securing at the upper end thereof a thrust retainer (27) upwardly adjacent to said radial bearing (18), said kingpin (17) having a bevel gear (21) in mesh with said output bevel gear (10) and a bevel gear (23) in mesh with a reduction bevel gear (25) for driving a front wheel (2) at the lower end thereof downwardly projecting from said bevel gear case (13), said two bevel gears (21), (23) being so disposed that axial thrust exerted on said kingpin (17) by said respective gears (21), (23) can be balanced.

2. An apparatus of claim 1 further comprising:
  a front wheel case (24) including lower and lateral cases (29), (30), said lower case (29) rotatably mounted on said lower tubular portion and said lateral case (30) at the middle portion thereof defining a tubular axle base (35);
  means (37) for fixedly securing said reduction bevel gear (25), said means being rotatably journaled on said axle base (35) and having an outer end portion secured to said front wheel (2).

3. An apparatus of claim 2 further comprising:
a knuckle pin (47) fixedly fitted into an innter surface of said upper tubular portion; and
a knuckle arm (46) mounted on said knuckle pin (47) for coaxial rotation with said kingpin (17), said knuckle arm (46) having a steering arm operatively associated with a steering apparatus (5) and a lateral portion secured to said lateral case (30) of said front wheel case (24).

4. A front wheel driving apparatus for a vehicle, comprising:
means for firstly transmitting rotation, said means including a front axle case connected to the vehicle, a differential output shaft rotationally situated in said front axle case, and a bevel pinion connected to an end of the differential output shaft,
means for secondly transmitting rotation, said means including a bevel gear case removably attached to the front axle case and having upper and lower tubular portions coaxially aligned with each other, a kingpin rotationally supported by said upper and lower tubular portions of the bevel gear case, said kingpin having first and second bevel gears, said first bevel gear being situated at an upper portion thereof and meshing with the bevel pinion of the differential output shaft and the second bevel gear being situated at a lower portion of the kingpin, and means for supporting the kingpin, said means including a radial bearing situated in the upper tubular portion, a needle bearing situated in the lower tubular portion and at least one thrust retainer connected at the upper portion of the kingpin so that the kingpin is rotationally supported by the radial bearing and the needle bearing and is vertically supported by the retainer relative to the bevel gear case, and
means for thirdly transmitting rotation, said means including a front wheel case pivotally connected to the bevel gear case, and a fixture base rotationally supported by the front wheel case and adapted to be connected to a front wheel, said fixture base having a mating bevel gear meshing with the second bevel gear of the kingpin so that axial thrust exerted on the kingpin by the first and second bevel gears is substantially balanced.

5. A front wheel driving apparatus according to claim 4, further comprising a knuckle pin fitted in an inner surface of the upper tubular portion of the bevel gear case, and a knuckle arm mounted on the knuckle pin to be coaxially rotated with the kingpin and connected to the front wheel case, said knuckle arm being adapted to be connected to a steering arm so that when a steering apparatus is operated, the knuckle arm is actuated to thereby change direction of the front wheel.

6. A front wheel driving apparatus according to claim 5, in which said front wheel case includes lower and lateral cases, an inner ring situated in the lower case, a bush mounted between said knuckle pin and said knuckle arm, a thrust bearing situated in the lower case so that the front wheel case is adapted to rotate relative to said bevel gear case by means of said inner ring and said bush.

7. A front wheel driving apparatus according to claim 6, in which said lateral case of the front wheel case includes a hub base, said fixture base being rotationally disposed on the hub base.

8. A front wheel driving apparatus according to claim 7, in which said bevel gear case and front wheel case include oil passages so that oil in the bevel gear case can flow into the front wheel case for lubricating parts in the front wheel case by oil supplied from the bevel gear case.

* * * * *